US009310237B2

(12) United States Patent
Ramsay

(10) Patent No.: US 9,310,237 B2
(45) **Date of Patent: *Apr. 12, 2016**

(54) ULTRASONIC FLOW METERING USING COMPENSATED COMPUTED TEMPERATURE

(71) Applicant: DANIEL MEASUREMENT AND CONTROL, INC., Houston, TX (US)

(72) Inventor: Lawson Hamilton Ramsay, Falkirk (GB)

(73) Assignee: DANIEL MEASUREMENT AND CONTROL, INC., Houston, TX (US)

( * ) Notice: Subject to any disclaimer, the term of this patent is extended or adjusted under 35 U.S.C. 154(b) by 270 days.

This patent is subject to a terminal disclaimer.

(21) Appl. No.: 13/928,635

(22) Filed: Jun. 27, 2013

(65) Prior Publication Data

US 2015/0000420 A1 Jan. 1, 2015
US 2016/0091354 A9 Mar. 31, 2016

Related U.S. Application Data

(60) Provisional application No. 61/697,922, filed on Sep. 7, 2012.

(51) Int. Cl.
*G01F 1/86* (2006.01)
*G01F 1/66* (2006.01)

(52) U.S. Cl.
CPC ................ *G01F 1/662* (2013.01); *G01F 1/668* (2013.01)

(58) Field of Classification Search
CPC ..... G01M 3/2815; G08B 17/04; G01F 1/667; G01F 1/662
USPC ............... 73/861.28, 861.27, 861.18; 702/48; 340/606
See application file for complete search history.

(56) References Cited

U.S. PATENT DOCUMENTS 5,645,071 A 7/1997 Harnoncourt et al.
7,031,861 B2 4/2006 Cardelius et al.

(Continued)

FOREIGN PATENT DOCUMENTS

JP 08-061945 A 3/1996
JP 2011-257332 A 12/2011

OTHER PUBLICATIONS

International Patent Application No. PCT/US2013/058585, PCT International Search Report and Written Opinion dated Dec. 10, 2013 (10 pgs).

*Primary Examiner* — Jewel V Thompson
(74) *Attorney, Agent, or Firm* — Conley Rose, P.C.

(57) ABSTRACT

Apparatus and methods for verifying temperature measurements in an ultrasonic flow meter. An ultrasonic flow metering system includes a passage for fluid flow, a temperature sensor, an ultrasonic flow meter, and a flow processor. The temperature sensor is disposed to provide measured temperature of fluid flowing in the passage. The ultrasonic flow meter is configured to measure transit time of an ultrasonic signal through the fluid. The flow processor is configured to 1) compute speed of sound through the fluid based on the transit time; 2) calculate a computed temperature of the fluid based on the speed of sound; 3) apply compensation, based on a historical difference between the computed temperature and the measured temperature, to a temperature verification parameter; and 4) determine, based on the temperature verification parameter, whether a current difference between the measured temperature and the computed temperature is within a predetermined range.

25 Claims, 7 Drawing Sheets

(56) References Cited

U.S. PATENT DOCUMENTS

2009/0178490 A1 7/2009 Konzelmann et al.
2014/0109645 A1* 4/2014 Ramsay .......................... 73/1.34
2014/0109686 A1* 4/2014 Ramsay ..................... 73/861.18
2014/0109689 A1* 4/2014 Ramsay ..................... 73/861.28
2014/0109690 A1* 4/2014 Ramsay et al. ............ 73/861.28

* cited by examiner d
202
104
118
112
L
204
θ
102
200
X
220
114
206
116
210
212
214
216
218
208

SOS DERIVED TEMPERATURE VS MEASURED TEMPERATURE
CALCULATED TEMPERATURE
MEASURED TEMPERATURE
HIGH LIMIT
LOW LIMIT
TEMPERATURE
16
15
14
13
12
11
10
03/01/2012
04/01/2012
05/01/2012
06/01/2012
07/01/2012
08/01/2012
09/01/2012
10/01/2012
11/01/2012
12/01/2012
13/01/2012
14/01/2012

SOS SITE BIASED TEMPERATURE VS MEASURED TEMPERATURE
SYSTEMATIC BIAS = -0.37833 DEGREES CELSIUS
SOS BIAS TEMPERATURE
MEASURED TEMPERATURE
HIGH LIMIT
LOW LIMIT
TEMPERATURE
15.0
14.5
14.0
13.5
13.0
12.5
12.0
11.5
11.0
10.5
10.0
03/01/2012
04/01/2012
05/01/2012
06/01/2012
07/01/2012
08/01/2012
09/01/2012
10/01/2012
11/01/2012
12/01/2012
13/01/2012
14/01/2012

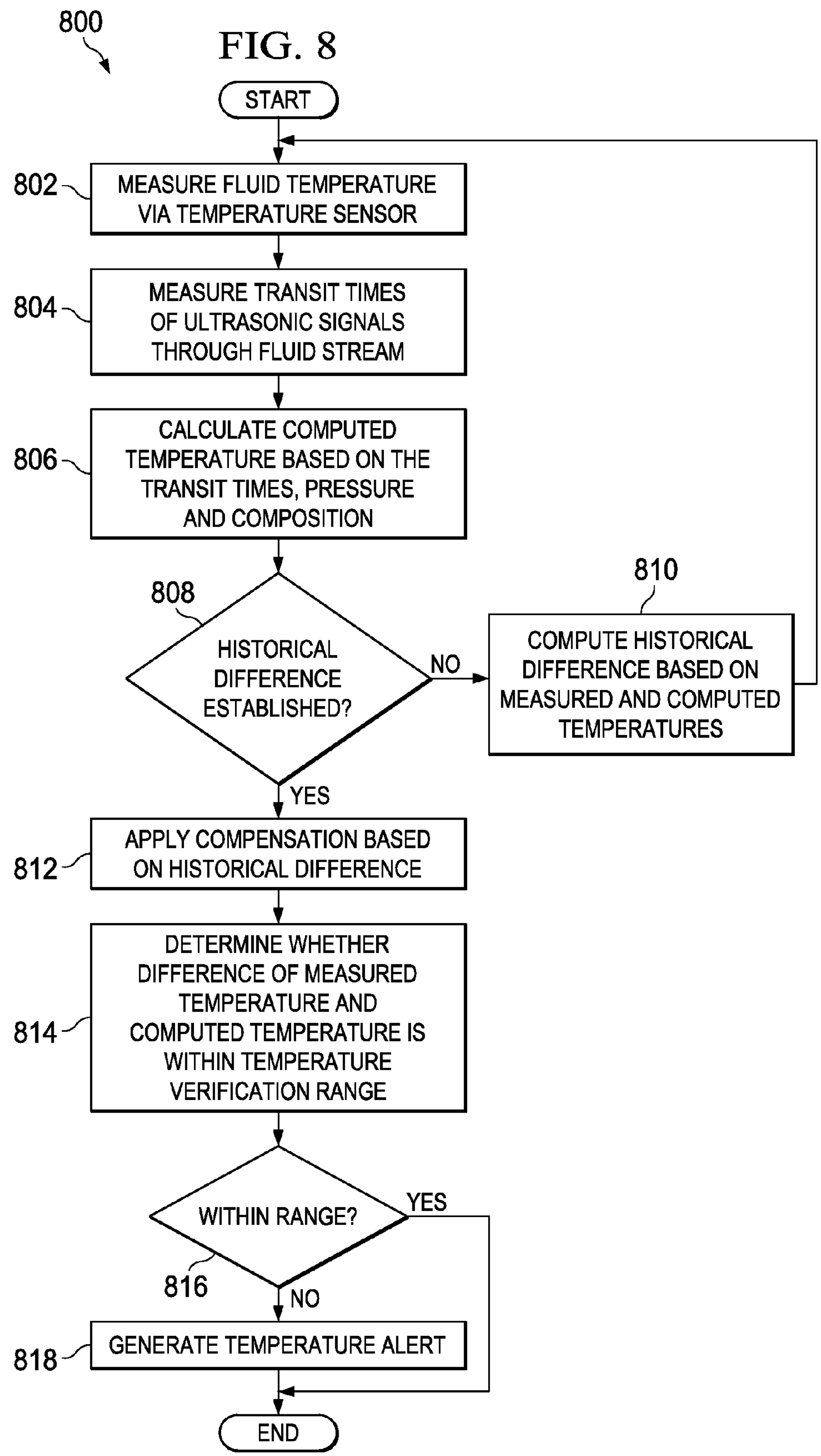
800
FIG. 8
START
802
MEASURE FLUID TEMPERATURE VIA TEMPERATURE SENSOR
804
MEASURE TRANSIT TIMES OF ULTRASONIC SIGNALS THROUGH FLUID STREAM
806
CALCULATE COMPUTED TEMPERATURE BASED ON THE TRANSIT TIMES, PRESSURE AND COMPOSITION
808
HISTORICAL DIFFERENCE ESTABLISHED?
NO
810
COMPUTE HISTORICAL DIFFERENCE BASED ON MEASURED AND COMPUTED TEMPERATURES
YES
812
APPLY COMPENSATION BASED ON HISTORICAL DIFFERENCE
814
DETERMINE WHETHER DIFFERENCE OF MEASURED TEMPERATURE AND COMPUTED TEMPERATURE IS WITHIN TEMPERATURE VERIFICATION RANGE
816
WITHIN RANGE?
YES
NO
818
GENERATE TEMPERATURE ALERT
END

ULTRASONIC FLOW METERING USING COMPENSATED COMPUTED TEMPERATURE

CROSS REFERENCE TO RELATED APPLICATION

The present application claims priority to U.S. Provisional Patent Application No. 61/697,922 filed on Sep. 7, 2012; which is hereby incorporated herein by reference in its entirety.

BACKGROUND

Natural gas is transported from place-to-place via pipelines. It is desirable to know with accuracy the amount of gas flowing in the pipeline, and particular accuracy is demanded when the fluid is changing hands, or "custody transfer." Even where custody transfer is not taking place, however, measurement accuracy is desirable, and in these situations, flow meters may be used.

Ultrasonic flow meters are one type of flow meter that may be used to measure the amount of fluid flowing in a pipeline. Ultrasonic flow meters have sufficient accuracy to be used in custody transfer. In an ultrasonic flow meter, acoustic signals are sent back and forth across the fluid stream to be measured. Based on parameters of received acoustic signals, the fluid flow velocity in the flow meter is determined. The volume of fluid flowing through the meter can be determined from determined flow velocities and the known cross-sectional area of the flow meter.

Various transducers are employed in conjunction with an ultrasonic flow meter to measure parameters of the fluid stream. For example, transducers may be employed to measure temperature, pressure, gas composition, density, relative density, calorific value, etc. of the fluid stream.

Accurate temperature measurement is important in flow metering systems to allow mass, volume correction and energy calculations to be performed. Speed of sound in a gas (e.g., natural gas) is dependent upon the gas composition, and the gas temperature and pressure. Inversely, temperature may be considered to be a function of the speed of sound in the gas, gas composition, and pressure. In an ultrasonic metering system equipped with pressure and gas composition transducers, the measured speed of sound (computed from the transit times of acoustic signals), the pressure and gas composition can be used to estimate temperature.

SUMMARY

Apparatus and methods for verifying temperature measurements in an ultrasonic flow metering system are disclosed herein. An ultrasonic flow metering system includes a passage for fluid flow, a temperature sensor, an ultrasonic flow meter, and a flow processor. The temperature sensor is disposed to provide measured temperature of fluid flowing in the passage. The ultrasonic flow meter is configured to measure transit time of an ultrasonic signal through the fluid. The flow processor is configured to 1) compute speed of sound through the fluid based on the transit time; 2) calculate a computed temperature of the fluid based on the speed of sound; 3) apply compensation, based on a historical difference between the computed temperature and the measured temperature, to a temperature verification parameter; and 4) determine, based on the temperature verification parameter, whether a current difference between the measured temperature and the computed temperature is within a predetermined temperature verification range.

In another embodiment, a method for temperature compensation in ultrasonic metering includes measuring temperature of a fluid stream flowing through an ultrasonic flow meter. Transit times of ultrasonic signals through the fluid stream are measured. A computed temperature of the fluid stream is calculated based on the transit times. Whether a given difference between the measured temperature and the computed temperature is within a predetermined temperature verification range is determined. Prior to the determining, at least one of the measured temperature, the computed temperature, the predetermined temperature verification range, and the given difference is compensated based on a historical difference between the computed temperature and the measured temperature.

In a further embodiment, a flow processor includes a temperature derivation engine, a temperature verification engine, and a temperature compensation engine. The temperature derivation engine is configured to calculate a computed temperature of a fluid stream based on measured speed of sound through the fluid stream. The temperature verification engine is configured to determine whether a current difference of the computed temperature and a measured temperature of the fluid stream is within a predetermined verification range. The temperature compensation engine is configured to determine a compensation value based on a historical difference between the computed temperature and the measured temperature. The temperature compensation engine is also configured to apply the compensation value to at least one of the measured temperature, the computed temperature, the predetermined verification range, and the current difference for use by the temperature verification engine.

In yet another embodiment, an ultrasonic flow metering system includes a passage for fluid flow, an ultrasonic flow meter, and a flow processor. The ultrasonic flow meter is configured to measure transit time of an ultrasonic signal through the fluid. The flow processor is configured to: 1) compute speed of sound through the fluid based on the transit time; 2) calculate a computed temperature of the fluid based on the speed of sound; 3) apply compensation, based on a historical difference between the computed temperature and a measured temperature, to the computed temperature; and 4) determine, volume of flow through the passage based on the compensated computed temperature.

BRIEF DESCRIPTION OF THE DRAWINGS

For a detailed description of exemplary embodiments of the invention, reference will now be made to the accompanying drawings in which:

FIG. 8 shows a flow diagram for a method for verifying temperature measurement in an ultrasonic flow metering system in accordance with various embodiments.

NOTATION AND NOMENCLATURE

Figure 1:
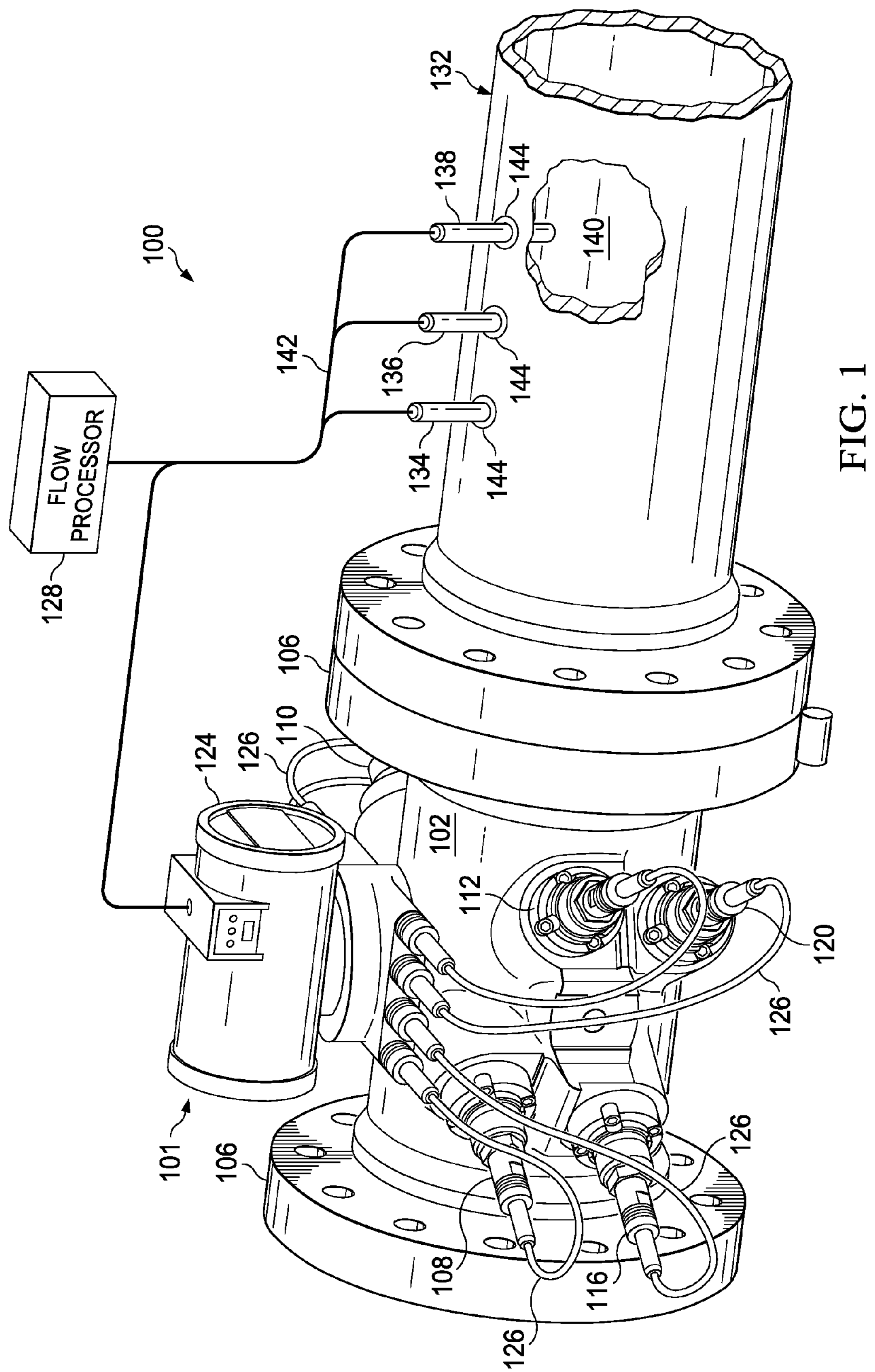
FIG. 1 shows an ultrasonic flow metering system in accordance with various embodiments.

In the following discussion and in the claims, the terms "including" and "comprising" are used in an open-ended fashion, and thus should be interpreted to mean "including, but not limited to . . . . " In addition, the term "couple" or "couples" is intended to mean either an indirect or a direct electrical connection. Thus, if a first device couples to a second device, that connection may be through a direct electrical connection, or through an indirect electrical connection accomplished via other devices and connections. Further, the term "software" includes any executable code capable of running on a processor, regardless of the media used to store the software. Thus, code stored in memory (e.g., non-volatile memory), and sometimes referred to as "embedded firmware, " is included within the definition of software. The recitation "based on" is intended to mean "based at least in part on." Therefore, if X is based on Y, X may be based on Y and any number of other factors. The term "fluid" includes liquids and gases.

DETAILED DESCRIPTION

The following description is directed to various exemplary embodiments of the invention. The drawing figures are not necessarily to scale. Certain features of the embodiments may be shown exaggerated in scale or in somewhat schematic form and some details of conventional elements may not be shown in the interest of clarity and conciseness. The disclosed embodiments should not be interpreted, or otherwise used, to limit the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment. It is to be fully recognized that the different teachings of the embodiments discussed below may be employed separately or in any suitable combination to produce desired results. Further, the various embodiments were developed in the context of measuring hydrocarbon flows (e.g., crude oil, natural gas), and the description follows from the developmental context; however, the systems and methods described are equally applicable to measurement of any fluid flow.

Because fluid temperature affects the speed of sound through fluid, and in turn affects the accuracy of ultrasonic flow measurement, proper operation of temperature transducers employed in ultrasonic metering should be routinely verified. The accuracy of temperature measurement required in an ultrasonic metering system may be governed by one or more national, international and/or industry standards or regulations. For example, NORSOK standard 1-104 relating to fiscal measurement systems for hydrocarbon gas specifies that the total uncertainty of temperature measure be better than ±0.15° Celsius.

Conventional methods of verifying temperature measurement instrumentation (e.g., temperature transducer, temperature transmitter, etc.) in an ultrasonic flow metering system apply preventative maintenance for in situ verification. For example, temperature measurements provided by the temperature measurement instrumentation of the metering system may be compared against concurrent measurements provided by temperature measurement equipment calibrated by an accredited laboratory. Such verification requires addition of a test thermal well and shut in of the metering system. Alternatively, the metering system may include two sets of temperature measurement instrumentation to allow continual comparison of the redundant instrumentation. Unfortunately, conventional methods tend to increase system cost by requiring additional equipment and/or system down time.

Embodiments of ultrasonic metering system disclosed herein verify the operation of temperature measurement instrumentation without additional equipment and without system shut in, thereby reducing overall system cost. Embodiments disclosed herein compare temperature measurements provided by the temperature measurement instrumentation of the metering system to temperature values computed based on measurements of speed of sound, fluid pressure, fluid composition, etc. provided by the ultrasonic metering system. Embodiments include compensation to adjust the computed temperature values. The compensated temperature values may be compared to the measured temperature values to determine whether the performance of the temperature measurement instrumentation complies with an applicable standard. Lacking the compensation disclosed herein, discrepancies between measured and computed temperature values may inhibit comparison.

FIG. 1 shows an ultrasonic flow metering system 100 in accordance with various embodiments. The system 100 includes an ultrasonic flow meter 101, sensors 134, 136 138, and a flow processor 128. In the system 100, the ultrasonic flow meter 101 is coupled to a pipe or other structure 132. In some embodiments, the pipe 132 is disposed downstream of the ultrasonic flow meter 101. The pipe 132 includes openings 144 that allow sensors 134-138 to access the fluid stream flowing through the system 100. The flow processor 128 is coupled to the sensors 134-138 and to the ultrasonic meter 101. In some embodiments, the flow processor 128 may be integrated with electronics 124 of the ultrasonic meter 101.

The ultrasonic flow meter 101 includes a meter body or spool piece 102 that defines a central passage or bore. The spool piece 102 is designed and constructed to be coupled to a pipeline or other structure carrying fluids (e.g., natural gas) such that the fluids flowing in the pipeline travel through the central bore. While the fluids travel through the central bore, the ultrasonic flow meter 101 measures the flow rate (hence, the fluid may be referred to as the measured fluid). The spool piece 102 includes flanges 106 that facilitate coupling of the spool piece 102 to another structure. In other embodiments, any suitable system for coupling the spool piece 102 to a structure may be equivalently used (e.g., weld connections).

In order to measure fluid flow within the spool piece 102, the ultrasonic flow meter 101 includes a plurality of transducer assemblies. In the view of FIG. 1, five such transducers assemblies 108, 110, 112, 116 and 120 are in full or partial view. The transducer assemblies are paired (e.g., transducer assemblies 108 and 110), as will be further discussed below. Moreover, each transducer assembly electrically couples to control electronics package 124. More particularly, each transducer assembly is electrically coupled to the control electronics package 124 by way of a respective cable 126 or equivalent signal conducting assembly.

Figure 2:
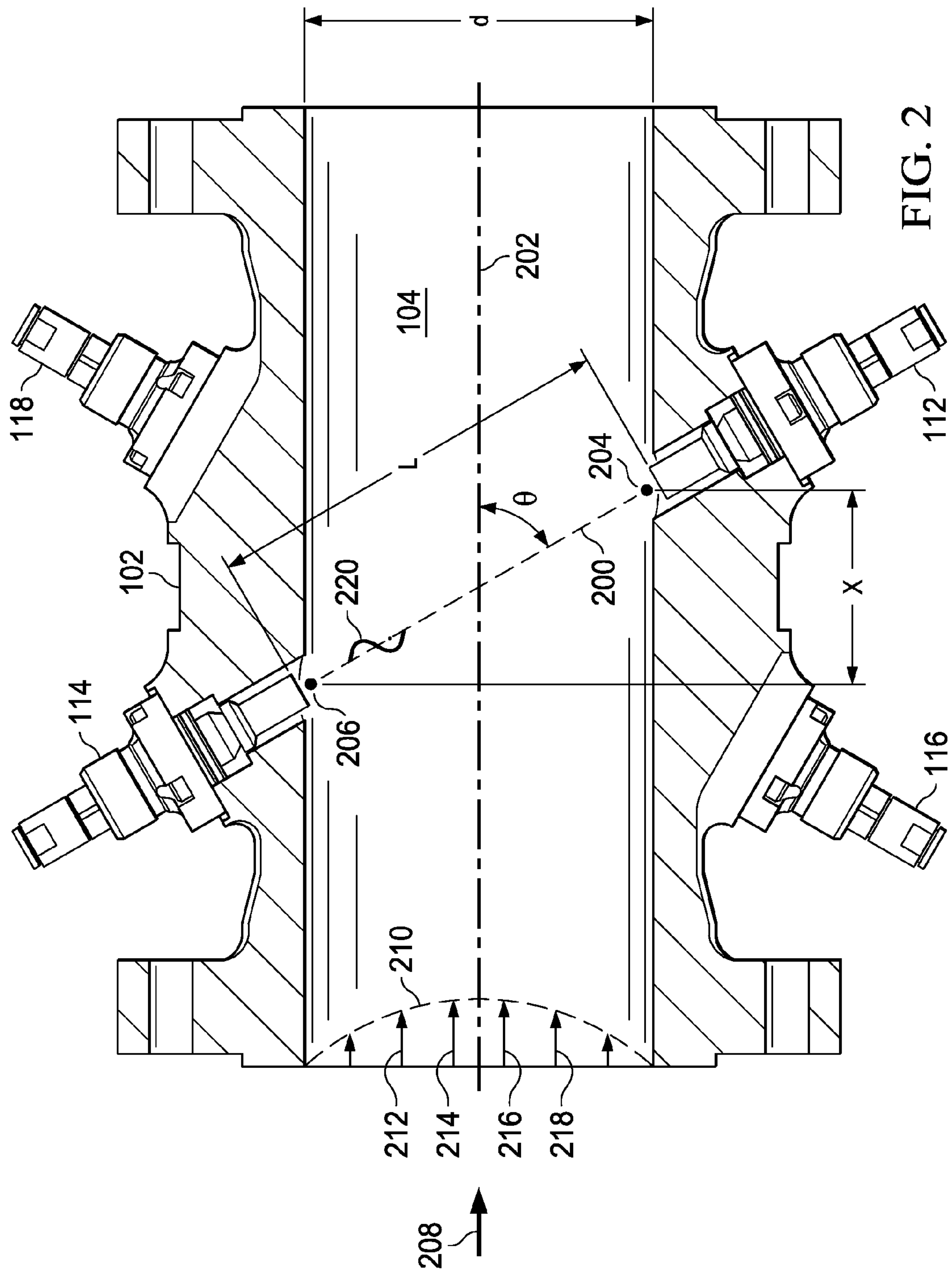
FIG. 2 shows a cross-sectional overhead view of an ultrasonic flow meter in accordance with various embodiments.

FIG. 2 shows a cross-sectional overhead view of the ultrasonic flow meter 101. Spool piece 102 has a predetermined size and defines the central bore 104 through which the measured fluid flows. An illustrative pair of transducers assemblies 112 and 114 is located along the length of spool piece 102. Transducers 112 and 114 are acoustic transceivers, and more particularly ultrasonic transceivers. The ultrasonic transducers 112, 114 both generate and receive acoustic signals having frequencies above about 20 kilohertz. The acoustic signals may be generated and received by a piezoelectric element in each transducer. To generate an ultrasonic signal, the piezoelectric element is stimulated electrically by way of a signal (e.g., a sinusoidal signal), and the element responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates an electrical signal (e.g., a sinusoidal signal) that is detected, digitized, and analyzed by the electronics 124 associated with the flow meter 101.

A path 200, also referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length d corresponding to the pipe inside diameter. In most cases, distances d, X, and L are precisely determined during flow meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Sometime later, the upstream transducer assembly 114 generates a return ultrasonic signal that is subsequently incident upon, and detected by, the downstream transducer assembly 112. Thus, the transducer assemblies exchange or play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the flow meter 101 carrying the fluid, the average velocity over the area of the central bore 104 may be used to find the volume of fluid flowing through the spool piece 102.

Ultrasonic flow meters can have one or more chords. For example, the flow meter 101 includes four chordal paths at varying elevations within the spool piece 102. The flow velocity of the fluid may be determined at each chord to obtain chordal flow velocities, and the chordal flow velocities combined to determine an average flow velocity over the entire pipe. From the average flow velocity, the amount of fluid flowing in the spool piece, and thus the pipeline, may be determined.

Typically, the control electronics 124 causes the transducers (e.g., 112, 114) to fire and receives output signals from the transducers. The control electronics 124 may also compute the mean flow velocity for each chord, compute the mean flow velocity for the meter, compute the volumetric flow rate through the meter, compute speed of sound through the fluid, perform meter diagnostics, etc. The volumetric flow rate and possibly other measured and computed values, such as flow velocity and speed of sound, may be output to additional devices, such as the flow processor 128. As noted above, the flow processor 128 may be included in the control electronics 124 in some embodiments.

For a given chord, the chordal flow velocity v is given by:

$$v = \frac{L^2}{2X} \cdot \frac{T_{up} - T_{dn}}{T_{up} T_{dn}}, \tag{1}$$

and the chordal speed of sound c is given by:

$$c = \frac{L}{2} \cdot \frac{T_{up} + T_{dn}}{T_{up} T_{dn}} \tag{2}$$

where:

L is the path length (i.e., face-to-face separation between upstream and downstream transducers), X is the component of L within the meter bore in the direction of the flow, and $T_{up}$ and $T_{dn}$ are the upstream and downstream transit times of sound energy through the fluid.

The average flow velocity through the meter 101 is given by:

$$v_{avg} = \sum_i w_i v_i \tag{3}$$

where:

$w_i$ is a chordal weighting factor, $v_i$ is the measured chordal flow velocity, and the summation i is over all chords.

Returning now to FIG. 1, the sensors 134-138 measure various attributes or parameters of the fluid, and provide the measurements to the flow processor 128 via signal conduction media 142 (e.g., wiring). The sensor 134 is a gas composition sensor, such as a gas chromatograph, that provides information indicative of the amount of each constituent of the gas flowing through the system 100. The sensor 136 is a pressure sensor that provides signals indicative of the pressure of the fluid flowing in the system 100. The sensor 138 is a temperature sensor (e.g., a resistance temperature detector) that provides signals indicative of the temperature of the fluid flowing through the system 100. The temperature sensor 138 extends into the interior passage 140 of the pipe 132, and measures the temperature of the fluid flowing through the system 100 at the terminus of sensor 138. Thus, the temperature sensor 138 is positioned to measure the temperature of the fluid at a specific elevation.

From the fluid composition, pressure, and temperature information provided by sensors 134, 136, and 138 respectively, the flow processor 128 can compute the speed of sound through the fluid stream using predetermined theoretical or experimental values. For example, the flow processor 128 may compute speed of sound in the fluid as specified in American Gas Association Report No. 10, "Speed of Sound in Natural Gas and Other Related Hydrocarbons" (AGA 10). Some embodiments of the flow processor 128 may use this computed speed of sound to verify the speed of sound values measured for each chord of the meter 101.

Similarly, based on the speed of sound measurements provided by the ultrasonic flow meter 101 and the measurements provided by the sensors 134, 136, the flow processor 128 can compute the temperature of the fluid flowing through the ultrasonic metering system 100. The flow processor 128 may compute the temperature using an iterative reverse of the speed of sound computation specified by AGA 10 based on the measured speed of sound provided by the ultrasonic meter 101, measured fluid composition provided by sensor 134 and measured fluid pressure provided by sensor 136.

Figure 3:
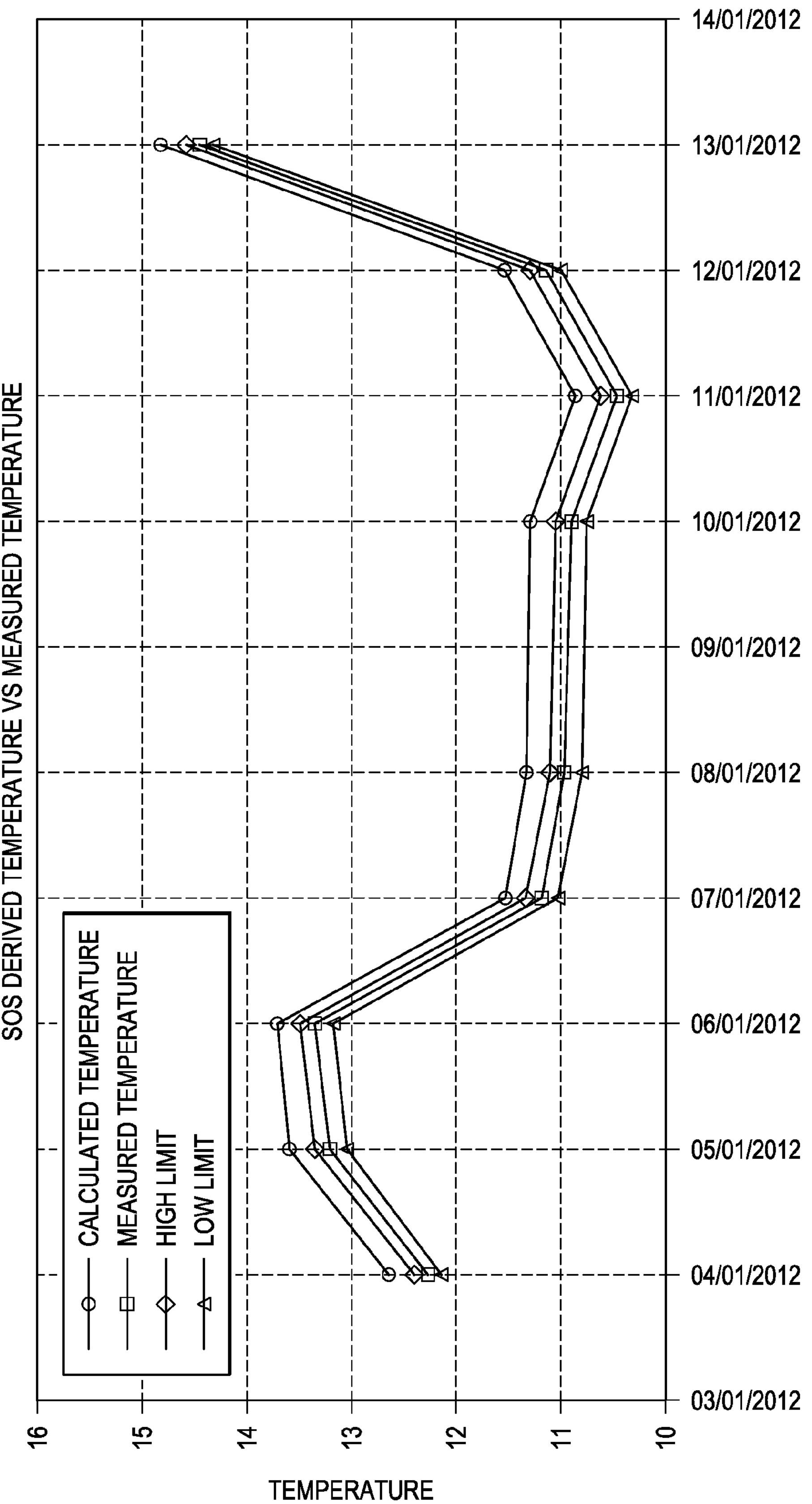
FIG. 3 shows an illustrative plot of measured temperature and computed temperature in an ultrasonic flow metering system.

FIG. 3 shows an illustrative plot of measured temperature and computed temperature in the ultrasonic flow metering system 100. The flow processor 128 may calculate the computed temperature using an iterative reverse of the speed of sound computation specified by AGA 10 based on the measured speed of sound provided by the ultrasonic meter 101, measured fluid composition provided by sensor 134 and measured fluid pressure provided by sensor 136. FIG. 3 also shows upper and lower alarm limits about the measured temperature. In this example, the upper and lower alarm limits are in accordance with the ±0.15° C. uncertainty limits specified by the Norwegian NORSOK standard. Alternatively, different limits, e.g., limits imposed by a different standard, may be applied. FIG. 3 shows that the computed temperature generally tracks the measured temperature, but the error between the two is too great to allow direct comparison when the applied alarm limits are considered.

Various factors may contribute to the error between the measured temperature and the computed temperature. For example, contributions to the error may arise from:

- uncertainty in the calculation of the computed temperature;
- difference in temperature at the single measure point of the temperature sensor and the weighted average chord temperature of the computed temperature;
- thermal lag between a resistive temperature detector (RTD) and temperature transmitter of the temperature sensor 138; and/or
- unsuitability of the size of an RTD for use with the installation profile of the ultrasonic metering system 100.

Figure 4:
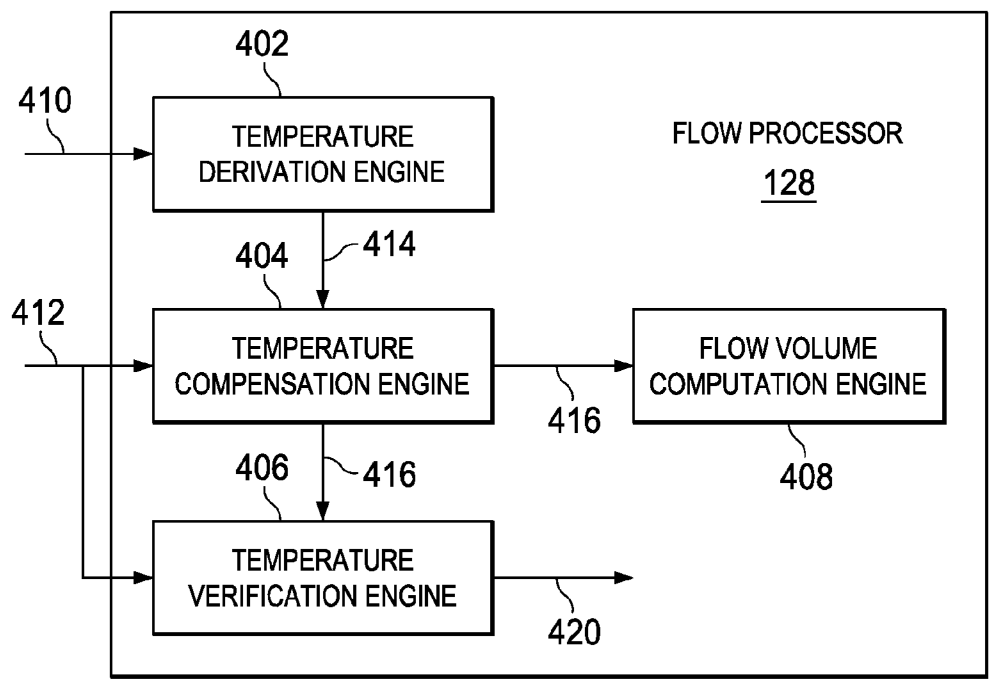
FIG. 4 shows a block diagram of a flow processor in accordance with various embodiments.

Embodiments of the flow processor 128 apply a compensation factor to adjust for the error between the measured and computed temperature values. Application of the compensation factor allows the measured and computed temperature values to be directly compared, and accuracy of the measured temperature to be judged based on the comparison. FIG. 4 shows a block diagram of the flow processor 128 in accordance with various embodiments. The flow processor 128 includes a temperature derivation engine 402, a compensation engine 404, and a temperature verification engine 406. The temperature derivation engine 402 calculates the computed temperature of the fluid stream flowing through the ultrasonic metering system 100. Measured fluid parameters 410 (e.g., pressure, composition, and speed of sound) are provided to the temperature derivation engine 402, and the temperature derivation engine 402 generates the computed temperature based on the parameters 410. The temperature derivation engine 402 may reverse the speed of sound computations specified by AGA 10 to generate the computed temperature.

The temperature compensation engine 404 computes a compensation factor to be applied in determining whether the measured temperature 412 and the computed temperature 414 are sufficiently different to indicate a potential temperature measurement error. The compensation factor may be based on a historical difference between the measured temperature 412 and the computed temperature 414. Various embodiments of the temperature compensation engine 404 may apply the compensation factor to a temperature verification parameter selected from: the computed temperature, the measured temperature, a temperature verification range (e.g., a standard specified temperature uncertainty range), or a difference between the measured and computed temperatures. As noted above, differences between the measured temperature and the computed temperature may be caused by one or more site dependent variables. Therefore, embodiments of the temperature compensation engine 404 determine the historical difference value based on measured temperature 412 and computed temperature 414 acquired after the system 100 is installed and operating at its operating site.

Some embodiments of the temperature compensation engine 404 may monitor the difference between time correspondent values of measured and computed temperature 412, 414 over time, and generate a historical difference value as an average of the differences over time. In other embodiments, a single instantaneous difference between a measured and computed temperature 412, 414 may be selected as the historical difference value (e.g., if the differences measured and computed temperatures are constant over time). In some embodiments, a plurality of historical values may be determined, each of the historical values corresponding to a predetermined range of measured or computed temperatures.

The temperature compensation engine 404 may generate a compensated value of computed temperature, measured temperature, or verification range by offsetting the temperature value or verification range by the historical value. For example, the temperature compensation engine 404 may add the historical value and the uncompensated computed temperature 414 to produce compensated temperature 416 that can be directly compared to the measured temperature 412. Similarly, the temperature compensation engine 404 may add the historical value and the measured temperature 412 to produce compensated temperature 416 that can be directly compared to the computed temperature 414.

The temperature verification engine 406 generates an alert 420 indicating that error between the measured temperature 412 and the computed temperature 414 is sufficiently large to indicate a potential temperature measurement error. For example, the temperature verification engine 406 may compare the measured temperature 412 with the compensated computed temperature 416 and if the difference between the measured temperature and the compensated computed temperature falls outside the predetermined verification range (e.g., a standard specified uncertainty), then the temperature verification engine 406 may assert the alert 420. More generally, one of the computed and measured temperatures is compensated and the other is not compensated. The temperature verification engine 406 may determine whether a difference between the compensated temperature value and the uncompensated temperature value is within the limits of the temperature verification range.

Figure 5:
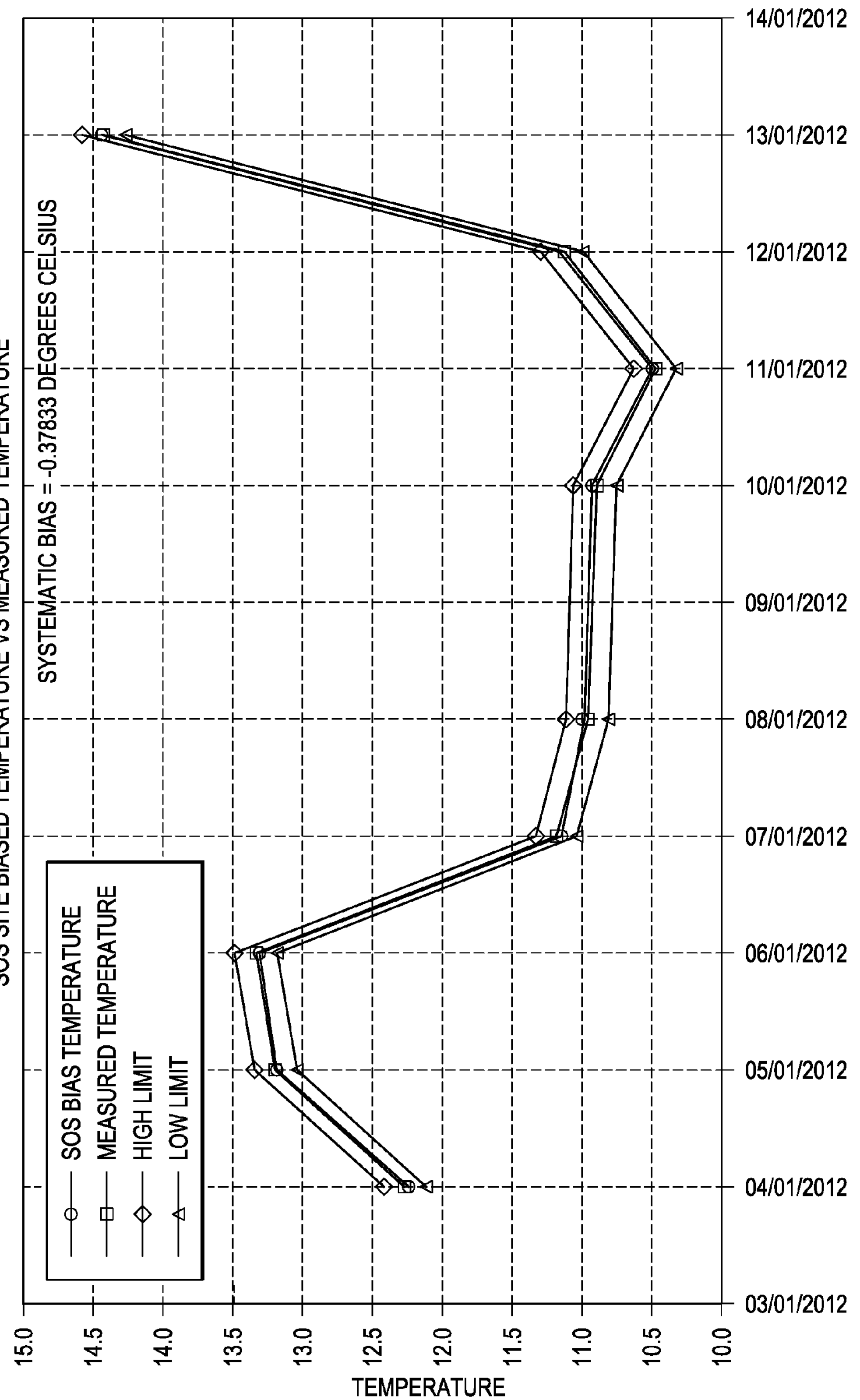
FIG. 5 shows an illustrative plot of measured temperature and compensated computed temperature in an ultrasonic flow metering system in accordance with various embodiments.

FIG. 5 shows an illustrative plot of measured temperature and compensated computed temperature in the ultrasonic flow metering system 100 in accordance with various embodiments. The data of FIG. 5 corresponds to the data of FIG. 3, with compensation applied to the data of FIG. 3 to generate the data of FIG. 5. To generate the data of FIG. 5, the temperature derivation engine 402, calculated the computed temperature values shown in FIG. 3 as outside the low and high limits of the verification range. The temperature compensation engine 404 computed a historical difference value of −.037833° C. based on the computed and measured temperature values, and added the historical difference value to the computed temperature to generate the compensated temperature shown in FIG. 5. As shown in FIG. 5, due to the compensation, the difference between the measured temperature and the compensated temperature is relatively small and well within the limits of the temperature verification range.

Figure 6:
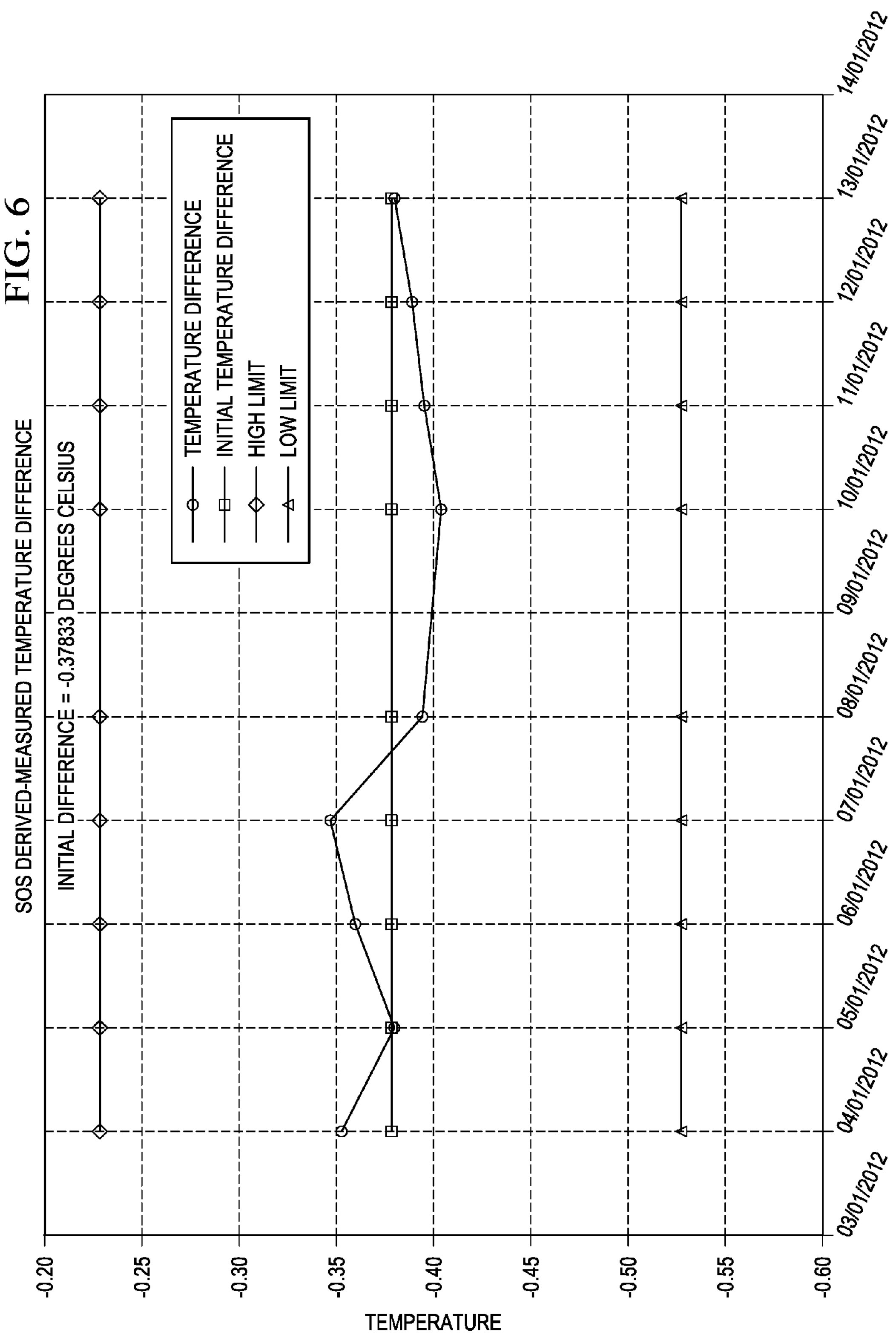
FIG. 6 shows an illustrative plot of the difference of measured temperature and compensated computed temperature in an ultrasonic flow metering system in accordance with various embodiments.

In some embodiments, the temperature compensation engine 404 applies the historical difference value to compensate the temperature verification range. In one such embodiment, the compensation centers the temperature verification range on the historical difference value. The temperature verification engine 406 compares the historical difference between the measured and computed temperatures to the difference between current values of the measured and computed temperatures. If the difference between the historical difference value and the current difference value exceeds the upper or lower limits of the compensated temperature verification range, then the temperature verification engine 406 asserts the alert 420. FIG. 6 shows an illustrative plot of historical difference and current difference of measured temperature and computed temperature in the ultrasonic flow metering system 100 in accordance with various embodiments. The data of FIG. 6 corresponds to the data of FIG. 3, with compensation applied to the data of FIG. 3 to generate the data of FIG. 6. The temperature compensation engine 404 generated a historical value of −.037833° C. and applied the historical value to offset the temperature verification range (i.e., the range is centered on the historical difference). As shown in FIG. 6, the difference between the historical value temperature and the current difference value is relatively small and well within the limits of the temperature verification range. Alternatively, the temperature verification range may be centered at zero and the difference between the measured and computed temperatures may be offset in accordance with the historical difference.

Returning to FIG. 4, embodiments of the flow processor 128 may also include a flow volume computation engine 408. The flow volume computation engine 408 determines the volume of fluid flowing through the ultrasonic flow metering system 100 at a given temperature and pressure (e.g., the current measured temperature and pressure of the fluid stream). In some embodiments, the flow volume computation engine 408 determines the volume of flow based on the compensated temperature 416 generated by the temperature compensation engine 404 rather than the measured temperature provided by the temperature sensor 138.

In some embodiments of the flow processor 128, the temperature compensation engine 404 applies the compensation factor to adjust the value of the computed temperature 414, thereby generating a compensated computed temperature. The flow volume computation engine 408 may apply the compensated computed temperature to compute fluid flow volume. The compensated computed temperature may be applied in lieu of a measured temperature value 412. In embodiments of the flow metering system 100 so applying the compensated computed temperature, the temperature sensor 138 may be omitted. The temperature compensation engine may establish the compensation factor based on temperature measurements provided by a temperature sensor coupled to the flow metering system 100 for purposes of determining the compensation factor. For example, a temperature transducer calibrated by an accredited laboratory may be temporarily introduced into the system 100 via a test thermowell. After temperature measurements sufficient to establish the compensation factor have been acquired, the temperature sensor may be removed from the system 100.

Embodiments of the temperature derivation engine 402, temperature compensation engine 404, temperature verification engine 406, and flow computation engine 408 include hardware and software resources (i.e., instructions) to perform the functions disclosed herein. For example, some embodiments of the temperature derivation engine 402, temperature compensation engine 404, temperature verification engine 406, and flow computation engine 408 may be implemented as a one or more processors executing instructions retrieved from a computer-readable storage medium. Processors suitable for implementing the engines 402-408 may include general-purpose microprocessors, digital signal processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. A non-transitory computer-readable storage medium suitable for storing instructions of the engines 402-408 may include volatile storage such as random access memory, non-volatile storage (e.g., a hard drive, an optical storage device (e.g., CD or DVD), FLASH storage, read-only-memory), or combinations thereof.

Figure 7:
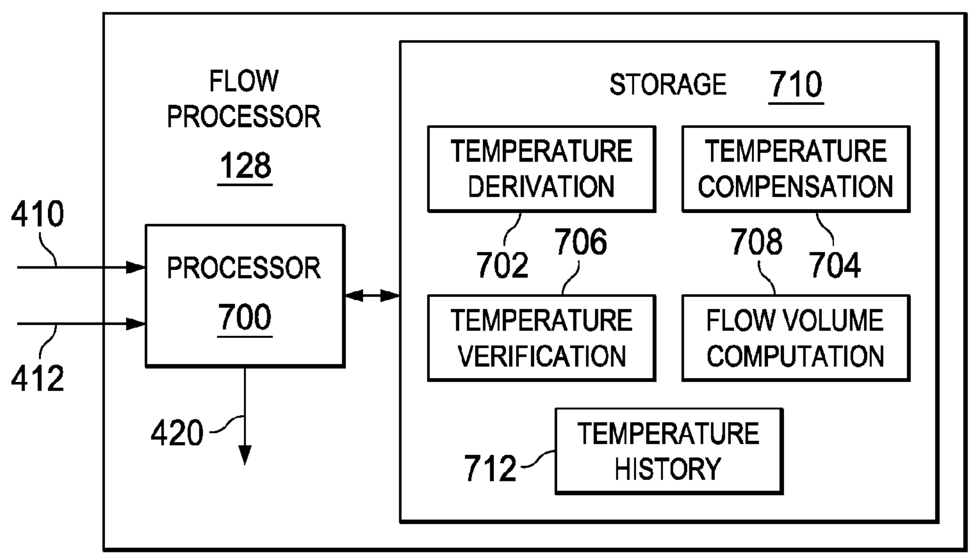
FIG. 7 shows a block diagram of a processor-based embodiment of a flow processor.

FIG. 7 shows a block diagram of a processor-based embodiment of the flow processor 128. The flow processor 128 embodiment of FIG. 7 includes a processor 700 and storage 710 coupled to the processor 700. The processor 700 is an instruction execution device as described above. The storage 710 is a computer-readable medium as described above. The processor 700 retrieves and executes instructions stored in the storage 710, reads data from the storage 710, and writes data to the storage 710. The storage includes a temperature derivation module 702, a temperature compensation module 704, a temperature verification module 706, and a flow volume computation module 708 each of which includes instructions for implementing the respective engines 402, 404, 406, and 408. The storage 712 may also include temperature history data 712 (e.g., historical measured and/or computed temperature values) useable, for example, to compute a historical difference between the measured and computed temperatures.

FIG. 8 shows a flow diagram for a method 800 for verifying temperature measurement in an ultrasonic flow metering system in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of FIG. 8, as well as other operations described herein, can be implemented as instructions stored in computer readable medium 710 and executed by processor 700.

In block 802, fluid is flowing through the central passage 104 of the ultrasonic flow meter 101, and past the sensors 134-138. The temperature sensor 138 measures the temperature of the fluid flowing about the temperature sensor 138. The fluid temperature measurement value provided by the temperature sensor 138 is indicative of the temperature of the fluid flowing at the elevation at which the temperature sensor 508 is disposed in the pipe 132.

In block 804, the ultrasonic flow meter 101 generates ultrasonic signals that are exchanged between the transducers of each transducer pair (e.g., 112, 114). The meter 101 measures the ultrasonic signal transit times between the transducers, and computes a speed of sound value for each transducer pair (i.e., for each chordal path), as shown in equation (2).

In block 806, the flow processor 128 calculates a computed temperature value of the fluid stream. The computed temperature value is based on the measured speed of sound values and fluid pressure and composition measurements provided by the sensors 134, 136. The flow processor 128 may calculate the computed temperature iteratively based on a reversal of the AGA 10 speed of sound computations.

In block 808, if a historical difference between measured and computed temperature has not been established, then, in block 810, the flow processor computes the historical difference provided sufficient difference data has been accumulated. The flow processor 128 may base the historical difference on difference values acquired over time. For example, the historical difference may be an average of difference values acquired over time, or may be an instantaneous difference if the difference between measured and computed temperatures is constant over time. In some embodiments, a historical difference value may be determined for each subrange of a temperature range over which the flow metering system 100 is operating.

If, in block 808, the historical difference has been established, then, in block 812, the flow processor applies the historical difference to compensate one of the computed temperature, the measured temperature, and a temperature verification range. The compensation may involve offsetting or biasing the parameter being compensated by the historical value. For example, the historical value may be added to a temperature value or serve as the center of the verification range.

In block 814, the flow processor 128 determines whether a difference of the measured and computed temperature values is within the limits of the temperature verification range. For example, if the temperature verification range is referenced to the measured temperature, then the flow processor may determine whether the compensated computed temperature falls within the limits of the verification range. Similarly, if the temperature verification range is referenced to the computed temperature, then the flow processor may determine whether the compensated measured temperature falls within the limits of the verification range. Alternatively, if the temperature verification range is referenced to the historical difference value, then the flow processor may determine whether the difference of the measured temperature and the computed temperature falls within the limits of the verification range. The bounds or limits of the temperature verification range may be in accordance with a temperature uncertainty limit specified by a national, international, or industry standard.

If, in block 816, the difference of the measured and computed temperatures is within the temperature verification range, then processing continues with measurement of fluid stream temperature in block 802. On the other hand, if the difference is not within the temperature verification range, then the flow processor 128 issues a temperature alert in block 818. The temperature alert may be visual indicator, an audible indicator, a message, etc. that alerts an operator of the ultrasonic flow metering system 100 to a potential temperature measurement error.

Thus, embodiments of the systems and methods disclosed herein provide verification of temperature measurement instruments in an ultrasonic flow metering system without additional instruments and/or system down time for testing.

The above discussion is meant to be illustrative of the principles and various exemplary embodiments of the present invention. Numerous variations and modifications will become apparent to those skilled in the art once the above disclosure is fully appreciated. It is intended that the following claims be interpreted to embrace all such variations and modifications.

What is claimed is:

1. An ultrasonic flow metering system, comprising:

a passage for fluid flow;

a temperature sensor disposed to provide measured temperature of fluid flowing in the passage;

an ultrasonic flow meter configured to measure transit time of an ultrasonic signal through the fluid flowing in the passage; and a flow processor configured to:

compute speed of sound through the fluid based on the transit time;

calculate a computed temperature of the fluid based on the computed speed of sound;

apply compensation, based on a historical difference between the computed temperature and the measured temperature, to a temperature verification parameter; and determine, based on the temperature verification parameter, whether a current difference between the measured temperature and the computed temperature is within a predetermined range.

2. The system of claim 1, wherein the temperature verification parameter comprises at least one of the measured temperature, the computed temperature, the predetermined range, and the current difference between the measured temperature and the computed temperature.

3. The system of claim 1, wherein the temperature verification parameter is one of the computed temperature and the measured temperature, and the flow processor is configured to:

compute the temperature verification parameter by offsetting, based on the historical difference, one of the computed temperature and the measured temperature; and compute the current difference as a difference between the temperature verification parameter and the one of the computed temperature and the measured temperature not compensated.

4. The system of claim 1, wherein the temperature verification parameter is one of the predetermined range and a difference between the computed temperature and the measured temperature, and the flow processor is configured to compute the temperature verification parameter by offsetting, based on the historical difference, one of the predetermined range and the difference between the computed temperature and the measured temperature; and compute the current difference as a difference between the temperature verification parameter and the historical difference.

5. The system of claim 1, wherein the flow processor is further configured to compute the historical difference as a value unique to an installation site of the system.

6. The system of claim 1, wherein the flow processor is further configured to compute the historical difference as an average difference between the computed temperature and the measured temperature over time.

7. The system of claim 1, wherein the flow processor is further configured to compute the historical difference as an instantaneous difference between the computed temperature and the measured temperature.

8. The system of claim 1, wherein the flow processor is further configured to compute the historical difference as a plurality of difference values, each of the difference values corresponding to a difference between the computed temperature and the measured temperature within a given temperature range.

9. The system of claim 1, wherein the flow processor is configured to issue an alert based on the current difference not being within the predetermined range.

10. The system of claim 1, wherein the flow processor is configured to:

compute a compensated temperature of the fluid that offsets the computed temperature based on the historical difference; and determine volume of fluid flowing through the passage based on the compensated temperature.

11. A method for temperature compensation in ultrasonic metering, comprising:

measuring temperature of a fluid stream flowing through an ultrasonic flow meter;

measuring transit times of ultrasonic signals through the fluid stream;

calculating a computed temperature of the fluid stream based on the transit times;

determining whether a given difference between the measured temperature and the computed temperature is within a predetermined range; and compensating, prior to the determining, at least one of the measured temperature, the computed temperature, the predetermined range, and the given difference based on a historical difference between the computed temperature and the measured temperature.

12. The method of claim 11, wherein the determining comprises:

computing a compensated temperature of the fluid stream that offsets one of the computed temperature and the measured temperature based on the historical difference;

determining the given difference to be a difference of the compensated temperature and the one of the computed temperature and the measured temperature not compensated; and generating an alert based on the given difference not being within the predetermined temperature verification range.

13. The method of claim 11, wherein the determining comprises:

compensating the predetermined range by offsetting the predetermined range based on the historical difference;

determining the given difference to be a difference between the computed temperature and the measured temperature; and generating an alert based on the given difference not being within the compensated predetermined range.

14. The method of claim 11, further comprising computing the historical difference as at least one of:

an average difference between the computed temperature and the measured temperature over time;

an instantaneous difference between the computed temperature and the measured temperature; and a plurality of difference values, each of the difference values corresponding to a difference between the computed temperature and the measured temperature within a given temperature range.

15. The method of claim 11, further comprising:

computing a compensated temperature of the fluid stream that offsets the computed temperature based on the historical difference; and determining volume of the fluid stream based on the compensated temperature.

16. The method of claim 11, further comprising computing the historical difference based on measured temperature and computed temperature values acquired at an installation site of an ultrasonic metering system measuring the fluid stream.

17. A flow processor, comprising:

a temperature derivation engine configured to calculate a computed temperature of a fluid stream based on measured speed of sound through the fluid stream;

a temperature verification engine configured to determine whether a current difference of the computed temperature and a measured temperature of the fluid stream is within a predetermined verification range; and a temperature compensation engine configured to:

determine a compensation value based on a historical difference between the computed temperature and the measured temperature; and apply the compensation value to at least one of the measured temperature, the computed temperature, the predetermined verification range, and the current difference for use by the temperature verification engine.

18. The flow processor of claim 17, wherein:

the compensation engine is configured to compute a compensated temperature of the fluid stream that biases one of the computed temperature and the measured temperature in accordance with the historical difference; and the temperature verification engine is configured to:

compute the current difference as a difference of the compensated temperature and the one of the measured temperature and the computed temperature not compensated; and generate an alert based on the current not being within the predetermined verification range.

19. The flow processor of claim 17, wherein:

the compensation engine is configured to compensate the predetermined verification range by biasing the predetermined verification range based on the historical difference; and the temperature verification engine is configured to:

compute the current difference as a difference between the computed temperature and the measured temperature; and generate an alert based on the current difference not being within the compensated predetermined verification range.

20. The flow processor of claim 17, wherein the verification range determination engine is configured to compute the historical difference as at least one of:

an average difference between the computed temperature and the measured temperature over time;

an instantaneous difference between the computed temperature and the measured temperature; and a plurality of difference values, each of the difference values corresponding to a difference between the computed temperature and the measured temperature within a given temperature range.

21. The flow processor of claim 17, wherein the compensation engine is configured to compute a compensated temperature of the fluid stream that biases the computed temperature in accordance with the historical difference; and wherein the flow processor further comprises a flow volume computation engine configured to determine volume of the fluid stream based on the compensated temperature.

22. The flow processor of claim 17, wherein the temperature verification engine is configured to generate an alert based on the current difference being not within the predetermined verification range.

23. An ultrasonic flow metering system, comprising:

a passage for fluid flow;

an ultrasonic flow meter configured to measure transit time of an ultrasonic signal through the fluid; and a flow processor configured to:

compute speed of sound through the fluid based on the transit time;

calculate a computed temperature of the fluid based on the speed of sound;

apply compensation, based on a historical difference between the computed temperature and a measured temperature, to the computed temperature to generate a compensated computed temperature; and determine volume of flow through the passage based on the compensated computed temperature.

24. The system of claim 23, wherein the system lacks a temperature sensor for measuring temperature of the fluid.

25. The system of claim 23, wherein the flow processor is configured to determine volume of flow based on the compensated computed temperature and not based on a corresponding measurement of fluid temperature provided by a temperature sensor.

* * * * *